United States Patent
Marzorati et al.

(10) Patent No.: US 11,106,631 B2
(45) Date of Patent: Aug. 31, 2021

(54) COOKIE EXCLUSION PROTOCOLS

(71) Applicant: International Business Machines Corporation, Armonk, NY (US)

(72) Inventors: Mauro Marzorati, Lutz, FL (US); Yaser K. Doleh, North Royalton, OH (US); Rosa M. Bolger, Austin, TX (US); Brian W. Jensen, Raleigh, NC (US); Seda Ozses, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 15/838,635

(22) Filed: Dec. 12, 2017

(65) Prior Publication Data

US 2019/0179923 A1   Jun. 13, 2019

(51) Int. Cl.
| | |
|---|---|
| *H04L 29/08* | (2006.01) |
| *H04L 29/06* | (2006.01) |
| *G06F 16/17* | (2019.01) |
| *G06F 16/95* | (2019.01) |
| *G06F 16/954* | (2019.01) |

(52) U.S. Cl.
CPC .............. *G06F 16/17* (2019.01); *G06F 16/95* (2019.01); *G06F 16/954* (2019.01); *H04L 29/06013* (2013.01); *H04L 63/00* (2013.01); *H04L 67/02* (2013.01); *H04L 67/146* (2013.01); *H04L 67/28* (2013.01)

(58) Field of Classification Search
None
See application file for complete search history.

(56) References Cited

U.S. PATENT DOCUMENTS

| | | | |
|---|---|---|---|
| 7,206,805 B1 | 4/2007 | McLaughlin, Jr. | |
| 8,090,877 B2 | 1/2012 | Agarwal et al. | |
| 8,181,238 B2 | 5/2012 | Holar et al. | |
| 8,856,869 B1* | 10/2014 | Brinskelle | G06F 21/6218 726/2 |
| 9,100,337 B1* | 8/2015 | Battre | H04L 67/22 |
| 2005/0015429 A1* | 1/2005 | Ashley | G06Q 30/02 709/200 |

(Continued)

OTHER PUBLICATIONS

Barrett et al., "Intermediaries: New Places for Producing and Manipulating Web Content," Computer Networks and ISDN Systems, North Holland Publishing, Amsterdam, NL, vol. 30, No. 1-7, Apr. 1998, pp. 509-518. Retrieved from Internet using: https://www.docketalarm.com/cases/PTAB/IPR2014-00300/Inter_Partes_Review_of_U.S._Pat._7254621/docs/12-26-2013-PET-1130/Exhibit-1008-Exhibit_1008__Barrett_et_al_April_1998.pdf.

(Continued)

*Primary Examiner* — Mohamed Ibrahim
(74) *Attorney, Agent, or Firm* — Scully, Scott, Murphy & Presser, P.C.; Anthony R. Curro

(57) ABSTRACT

A cookie directive file may include an exclusion directive specifying sub domain names associated with the server specified in disjointed form. A hardware processor may request the cookie directive file from a server computer and store the cookie directive file locally with the hardware processor. Responsive to detecting a browser request to send to the server computer, the hardware processor may cull existing cookies based on cookie setting attributes associated with the existing cookies, and remove from the culled list of existing cookies to be sent with the browser request, a cookie that matches the exclusion directive.

20 Claims, 5 Drawing Sheets

(56) References Cited

U.S. PATENT DOCUMENTS

| | | |
|---|---|---|
| 2005/0251856 A1 | 11/2005 | Araujo et al. |
| 2005/0262357 A1 | 11/2005 | Araujo et al. |
| 2005/0273849 A1 | 12/2005 | Araujo et al. |
| 2007/0005606 A1 | 1/2007 | Ganesan et al. |
| 2009/0106349 A1 | 4/2009 | Harris |
| 2009/0193129 A1* | 7/2009 | Agarwal ............... H04L 67/28 709/229 |
| 2009/0199285 A1 | 8/2009 | Agarwal et al. |
| 2010/0064234 A1* | 3/2010 | Schreiber ............. G06F 9/454 715/760 |
| 2012/0036178 A1* | 2/2012 | Gavini ............... H04L 67/2804 709/203 |
| 2012/0089849 A1 | 4/2012 | Tsai |
| 2013/0117817 A1* | 5/2013 | Gantman ........... H04L 63/1466 726/4 |
| 2014/0196153 A1* | 7/2014 | Schran ............... G06F 21/6263 726/26 |
| 2016/0182650 A1* | 6/2016 | Zhao ................. G06F 16/9535 709/226 |
| 2017/0093888 A1 | 3/2017 | Marzorati et al. |

OTHER PUBLICATIONS

Yee, "A survey of Cookie Management Functionality and Usability in Web browsers," Internet Publication, [Online] (2002): pp. 1-11. Retrieved from Internet using: http://zesty.ca/2002/priv/cookie-survey.pdf.

Belshe et al., "Hypertext transfer protocol version 2 (http/2)." Google, Inc., M. Thomas, Ed. Mozilla, May 2015; Retrieved from Internet using: https://tools.ietf.org/html/rfc7540?utm_source=http2-r7&utm_medium=blog; 97 pages.

* cited by examiner

COOKIE EXCLUSION PROTOCOLS

FIELD

The present application relates generally to computers and computer applications, and more particularly to computer communications and cookie exclusion protocols in computer communications.

BACKGROUND

Cookies are used in World Wide Web (web) requests and responses between client and server computers, for example, to maintain information, such as state information throughout a web session. A browser is an application usually running on a client computer that makes a request to a server computer and receives responses from the server computer, processing the responses in a desired manner. Requests and responses between the client (e.g., via a browser running on the client) and server (e.g., web server) computers may include setting cookies and cookie parameters, for example, for controlling or specifying cookie scope. However, the current protocol for cookies does not provide for a mechanism to making negative or exclusion assertions about cookie scope. For example, in existing cookie protocol, the cookie scope is everywhere except for/common, which leads to inefficient use of system resources.

Cookies that are shared amongst several apps or applications need to have a scope that is inclusive of all the cases. For example, a cookie that needs to be presented to website addresses "w3-01.company.com/internalApp" and "www-01.company.com/externalApp" requires a scope with "*.company.com/*", the "*" character functioning as a wild character to match all characters (that portion of the address). As another example, a cookie shared between "www.company.com/app1" and "www.company.com/app2" requires a scope of "www. company.com/*". In the current inclusion mechanism for handling cookies, the app or application at "www.company.com/app3" will necessarily have to consume both applications' (app1 and app2) cookies as well, because there exists no mechanism for the browser to manage the exclusions, only inclusions. Such inclusion mechanism may incur waste in system resources, causing undue burden on a server or computer, for instance, since an application consumes cookies that the application may not need.

For example, the current cookie handling methodologies do not provide a mechanism to reduce or limit the scope of session or persistent cookies, leading to a proliferation of cookies and applications needing to process more cookies than what they need, further leading to server's input buffer overruns, cookie clashes and unintentional session highjacking, as well as inefficient use of network bandwidth.

BRIEF SUMMARY

Cookie exclusion protocol system and method may be provided. The system, in one aspect, may include a hardware processor, a network interface coupled with the hardware processor and a memory device coupled with the hardware processor. An application running on the hardware processor may be operable to request via the network interface, a cookie directive file that may include an exclusion directive specifying sub domain names associated with the server specified in disjointed form, from a server computer storing the cookie directive file. The application may be further operable to receive the cookie directive file from the server computer and store the cookie directive file in the memory device. Responsive to detecting a browser request to send to the server computer, the application may be further operable to cull existing cookies based on cookie setting attributes associated with the existing cookies, and further operable to remove from a culled list of existing cookies, a cookie that matches the exclusion directive. The application in sending the request to the server computer, may suppress sending of the cookie that matches the exclusion directive.

A method of excluding cookie or cookies via cookie exclusion protocol, in one aspect, may include requesting by a hardware processor via a network interface a cookie directive file from a server computer storing the cookie directive file. The cookie directive file may include an exclusion directive specifying sub domain names associated with the server specified in disjointed form. The method may also include receiving by the hardware processor, the cookie directive file from the server computer. The method may also include storing by the hardware processor, the cookie directive file in a memory device coupled with the hardware processor. The method may also include, responsive to detecting a browser request to send to the server computer, culling by the hardware processor existing cookies based on cookie setting attributes associated with the existing cookies, and removing from a culled list of existing cookies to be sent with the browser request, a cookie that matches the exclusion directive. The method may further include sending the browser request without the cookie that matches the exclusion directive.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
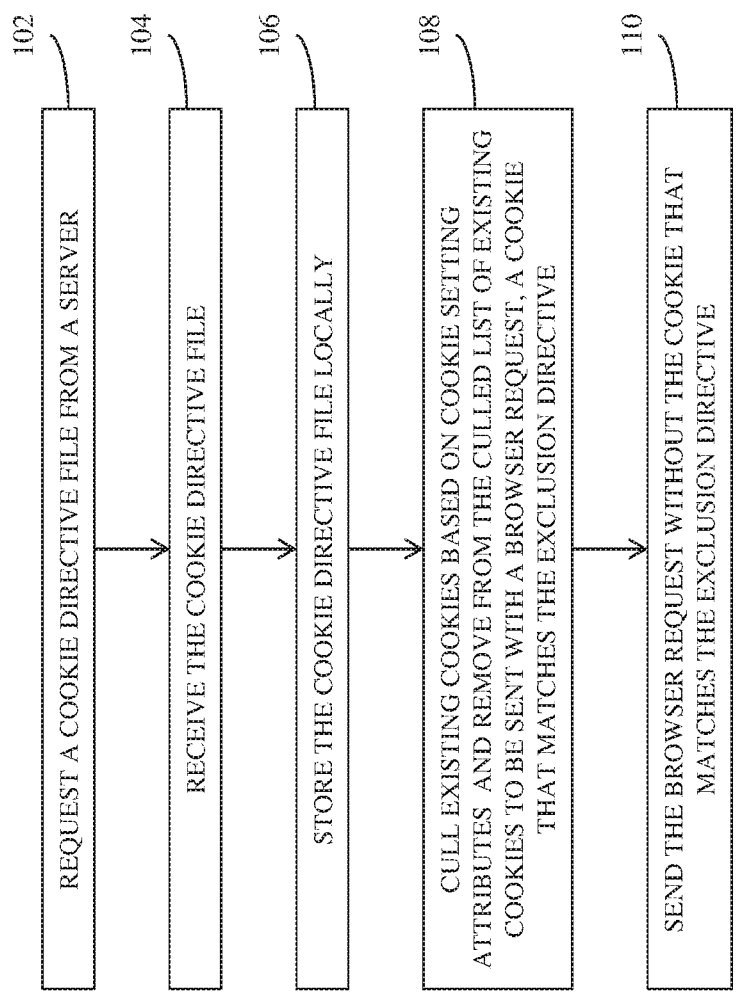
FIG. 1 is a flow diagram illustrating a method in one embodiment of controlling cookie exclusion.

A system, method and techniques may be provided for excluding or controlling cookies, for example, offered to a browser. For example, an exclusion mechanism in one embodiment may exclude or partition a domain space of a cookie. In one embodiment, an exclusion mechanism is provided in a browser to suppress cookies. Such mechanism, in one aspect, saves computer system resources.

In one embodiment, the system and/or method in one embodiment may define disjointed or non-contiguous scope designation in Hypertext Transfer Protocol (HTTP) cookies using a file, e.g., a text file such as "cookies.txt" file. In one embodiment, a browser is programmed to voluntarily suppress sending excluded cookies to a server. This mechanism reduces the proliferation of cookies and applications needing to process more cookies than what they need, which could lead to server input buffer overruns, cookie clashes and unintentional session highjacking, as well as inefficient use of network bandwidth.

In one embodiment, upon landing on a web server, a client computer may request a file, for example, cookies.txt file and cache (store) it locally on the client computer. Entries in the cookies.txt file may include: "Disallow:/common/", "Disallow:/*.gif".

In another embodiment, upon requesting a page, a browser may first perform a culling of the existing cookies available in the local storage based on each cookie's scope, expiration and security designator. The culled cookies are in the "inclusion" scope.

In yet another embodiment, based on entries in a downloaded cookies.txt file, a browser may perform an additional pass of cookies meeting the inclusion scope and remove cookies that match the exclusion directives. Still yet in another embodiment, the remaining cookies may be then passed by the client computer to the server computer for use by the app or application.

The system and/or method in one embodiment create disjointed or non-contiguous scope designation in HTTP cookies. Based on extending existing constructs, the system and method may implement different embodiments (e.g., as described above) for creating disjointed or non-contiguous scope designation in HTTP cookies. In some embodiments, a client-only scope for HTTP cookies may be created. In some embodiments, a cookie file, e.g., cookies.txt file may be created for servers to informally communicate to browsers and proxies an indication of which cookies should be excluded from which requests. In some embodiments, extensions may be implemented to the latest Request for Comments (RFC) dealing with the HTTP State Management Mechanism for servers to formally communicate disjointed scopes in state management at origination time.

The system and/or method in the present disclosure may reduce or limit the scope of session or persistent cookies, in turn reducing a proliferation of cookies that may occur. In this way an application need not process more cookies than what it needs, system resources (e.g., server buffer or memory, network bandwidth) are efficiently utilized, and a computer system may be protected from possible attacks, improving system security.

In one embodiment, the system and method may utilize a text file (e.g., cookies.txt) mechanism on a web server that will instruct a browser to voluntarily suppress sending excluded cookies to the server. The cookies.txt file includes records, which may be specified with predefined syntax. The mechanism in this embodiment may utilize a mechanism similar to "robots.txt" hosted on web servers and used in web crawlers.

Several directives in robots.txt can be processed in cookies.txt, such as "Host:selector". The system and/or method may use all directives in the "robots.txt" file in the same fashion. In one embodiment of the system and/or method, a User-Agent directive's behavior is equated to the Cookie directive.

As an example, a cookies text file that controls cookie exclusion (specifies cookies exclusion protocol) may include content and syntax such as shown in Table 1:

TABLE 1 cookies.txt

Cookie: *
Disallow: /common/
Disallow: /*.gif/

The "Cookie: *" specifies that the mechanism is applicable to all cookies. Other regular expressions may be applied to specify the desired scope of cookies.

Each following line or record specifies what URL (e.g., what part of a server) is to be excluded from receiving cookies. For example, "Disallow: /common/" indicates to exclude sending cookies to URLs with "/common/" component. "Disallow: /*.gif/" indicates to exclude sending cookies to URLs with "/*.gif/" component, '*' representing wildcard that matches all characters." For instance, sub domains of a domain may be specified in disjoint manner.

FIG. 1 is a flow diagram illustrating a method in one embodiment of controlling cookie exclusion. The method may be performed on executed by at least one hardware processor. For instance, a web browser executing on the hardware processor may perform the method shown in FIG. 1. At 102, a hardware processor requests via a network interface a cookie directive file from a server computer storing the cookie directive file. The cookie directive file may include an exclusion directive specifying sub domain names associated with the server specified in disjointed form. At 104, the hardware processor receives the cookie directive file from the server computer. At 106, the hardware processor stores the cookie directive file in a memory device coupled with the hardware processor. At 108, responsive to detecting a browser request to send to the server computer, the hardware processor culls existing cookies based on cookie setting attributes associated with the existing cookies, and removes from the culled list of existing cookies to be sent with the browser request, a cookie that matches the exclusion directive. At 110, the hardware processor sends the browser request without the cookie that matches the exclusion directive, for example, to the server computer.

For example, upon landing on a web server, the client (e.g., a browser running on a client computer) requests a cookies text file (e.g., cookies.txt file), which may be stored in memory device associated with a server, for example, a website or web server folder. The client receives the cookies text file in a response from the web server and caches it locally as per the headers in the response.

The client, for instance, a browser upon requesting a page, may perform culling of the existing cookies available in the local storage, based on each cookie's scope, expiration and security designator. The client, e.g., the browser also performs an additional pass that remove the cookies that match the directives (cookies text file) downloaded or received from the server.

Table 2 below summarizes the difference when using the sample cookies.txt file provided above.

TABLE 2

| Without cookie exclusion | With cookie exclusion |
| --- | --- |
| GET /images/logo.gif HTTP/1.1 | GET /images/logo.gif HTTP/1.1 |
| Host: www.example.com | Host: www.example.com |
| Cookie: cookie1=value1; cookie2=value2 | ~~Cookie: cookie1=value1; cookie2=value2~~ |
| Accept: */* | Accept: */* |

Based on the directive specified as "Disallow: /*.gif/" record in the above example cookies.txt file, the client (e.g., browser) excludes cookie1 and cookie2 (shown as strikethrough) from sending to the web server, when the browser sends "GET/images/log.gif" HTTP request to the server.

Figure 2:
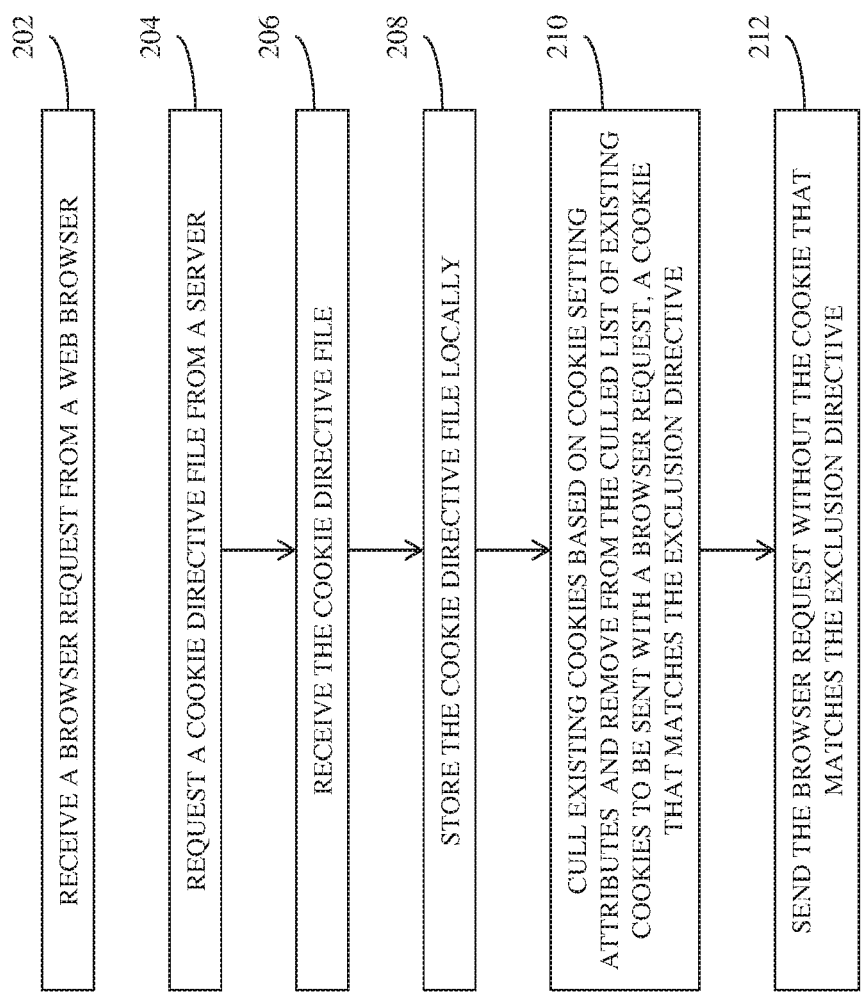
FIG. 2 is a flow diagram illustrating a method of controlling cookie exclusion in another embodiment.

FIG. 2 is a flow diagram illustrating a method of controlling cookie exclusion in another embodiment. At least one hardware processor may perform the method shown in FIG. 2. In this embodiment, the method allows for instructing a compliant HTTP proxy to be opaque to the excluded cookies. For example, the method shown in FIG. 2 may be performed by a web server proxy.

Table 3 shows an example of the content and syntax of cookies text file (e.g., cookies.txt file) used in cookies exclusion protocol in one embodiment.

TABLE 3 cookies.txt

Cookie: cookie1, cookie3
Disallow: /

The directive shown in Table 3 specifies that cookie 1 and cookie 3 are to be excluded from all sites on this server (e.g., indicated by the "l" representing root).

As a HTTP-compliant proxy behaves both as a server and as a client, the compliant proxy implements the cookie exclusion protocol in one embodiment when behaving as a client. Upon being requested to retrieve a page from an origin server the proxy verifies the existence of a cookies.txt file in the root of that server (or another designated location in the server) and loads it to the memory associated with the HTTP-compliant proxy. The proxy server applies the directives from the downloaded file to suppress the excluded cookies in the request to be made from the origin server.

Table 4 shows a request received by a proxy and a request generated by the proxy based on the directive specified in the cookies text file example shown in Table 3. Based on the directive that instructs to disallow cookie1 and cookie 3, the request generated by the proxy excludes cookie 1 (shown as a strikethrough) from the request.

TABLE 4

| Request received by proxy | Request generated by proxy |
| --- | --- |
| GET /images/logo.gif HTTP/1.1 | GET /images/logo.gif HTTP/1.1 |
| Host: www.example.com | Host: origin-www.example.com |
| Cookie: cookie1=value1; | Cookie: |
| cookie2=value2 | ~~cookie1=value1;~~ cookie2=value2 |
| Accept: */* | Accept: */* |

Referring to FIG. 2, at 202, a web proxy running on at least one hardware processor may receive a browser request from a web browser (e.g., original client). At 204, the web proxy requests, for example, via a network interface a cookie directive file from a server computer (e.g., origin server) storing the cookie directive file. The cookie directive file may include an exclusion directive specifying sub domain names associated with the server specified in disjointed form. At 206, the web proxy receives the cookie directive file from the server computer. At 208, the web proxy stores the cookie directive file in a memory device coupled with the hardware processor executing the web proxy. At 210, responsive to detecting a browser request to send to the server computer, the web proxy culls existing cookies based on cookie setting attributes associated with the existing cookies, and removes from the culled list of existing cookies to be sent with the browser request, a cookie that matches the exclusion directive. At 212, the web proxy sends the browser request without the cookie that matches the exclusion directive to the server computer (e.g., origin server).

In one embodiment, new attributes are introduced to the HTTP State Management Mechanism for the Set-Cookie HTTP header for the exclusionary definitions. The specification as currently implemented defines the scope of the cookie as a contiguous address/name space. In one embodiment of the system and/or method in the present disclosure, an exclusion mechanism is introduced such that the scope of a cookie can be a discontiguous address/name space. The concept of enumeration may be also implemented to create a discontiguous name space. Another attribute may be implemented for the definition of a client-only scope in HTTP Cookies.

Cookies are pieces of information stored on the client side, which are sent to the server with a request, for example, an HTTP request. Cookies can be set with attributes. Example directives in the current syntax for setting cookies (e.g., with Set-Cookie header) in HTTP requests include "Secure", "Domain," "Path", "HTTPonly" and "Expires".

In one embodiment, the system and method of the present disclosure defines or implements an "Except" attribute to be the negative of the currently existing "Domain" attribute. The "Domain" attribute defines inclusion of host and domain names to create the scope of the cookie, and the "Except" attribute defines exclusion of those same host and domain names. In one embodiment, the "Except" attribute is issued only in the presence of a "Domain" attribute.

The following shows example usage for the "Domain" and "Except" attributes:
Set-Cookie: cookieName=cookieValue; domain=.example.com; except=images.example.com The "Domain" attribute is also extended to be a comma-delimited (or another character-delimited) list of domain names which define the scope of the state management cookie. The RFC specifies a single value. The system and/or method of the present disclosure in one embodiment extend the protocol to allow for an enumerated list of applicable domains.

For example, "Set-Cookie: cookieName=cookieValue; domain=www.example.com, www1.example.com, www2.example.com" is functionally equivalent to these three directives issued in the same response:
"Set-Cookie: cookieName=cookieValue; domain=www.example.com
Set-Cookie: cookieName=cookieValue; domain=www1.example.com
Set-Cookie: cookieName=cookieValue; domain=www2.example.com"

The system and/or method of the present disclosure in one embodiment may also extend the "Domain" attribute to support a limited wildcard matching scheme, for example, as employed in SSL wildcard certificates (e.g., single level) for the domain that domain names which define the scope of the state management cookie. The RFC specifies a substring match algorithm.

The system and/or method of the present disclosure in one embodiment extend the protocol to allow for regex (regular expression) matching using, for example, conventional regex syntax within a level of applicable domains. The enumeration and wildcard domain features may be present at one time to create a powerful capability that reduces the processing impact at the browser/client level. The following illustrates some examples.

Example: "Set-Cookie: cookieName=cookieValue; domain=www*.example.com", where "*" can be any character or characters.

Example: "Set-Cookie: cookieName=cookieValue; domain=www([1-9]).example.com", where [1-9] indicates an optional one digit number between 1 and 9.

Example: "Set-Cookie: cookieName=cookieValue; domain=www(-?[0-9]?).example.com", where "-?" indicates an optional dash character followed by an optional one digit number between 0 and 9 indicated by [0-9].

Example: "Set-Cookie: cookieName=cookieValue; domain=www(-[a-z]).example.com", where "-[a-z]" indicates a dash character followed by a low case letter indicated by "[a-z]".

The regex functionality may apply to cookie names, all fields (e.g., disallow field and other fields), and all levels in domain names. For example, the regular expression matching in the present disclosure may accept conventional syntax for all fields.

In one embodiment, the "ClientOnly" attribute is defined similarly to the existing "HTTPOnly" and "Secure" attributes as value-less attributes (attributes without parameter value). The mere presence of the attribute indicates the activation of the defined behavior. The "ClientOnly" attribute instructs the client to process the cookie as per usual according to the other attributes present in the Set-Cookie directive with the added provision that the cookie should be flagged so that it is never presented to the origin server. The following illustrates an example.

Set-Cookie: cookieName=cookieValue; domain=.example.com; ClientOnly

Figure 3:
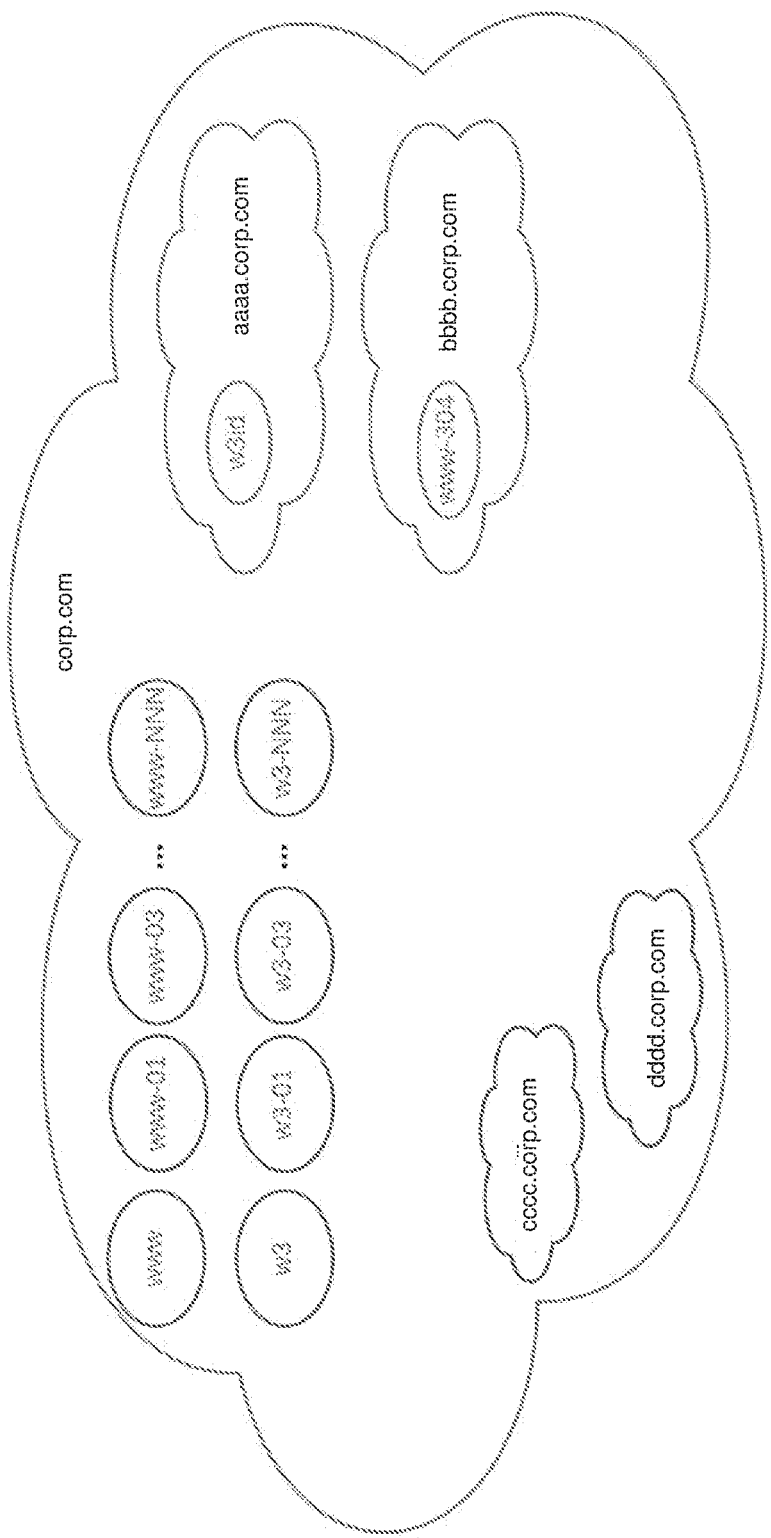
FIG. 3 is a diagram illustrating an example web site that includes multiple sub domains in one embodiment.

FIG. 3 is a diagram illustrating an example web site that includes multiple sub domains in one embodiment. A web server may host multiple web sites accessible by different domain names or host names in their Universal Resource Identifier (URI) or Uniform Resource Locator (URL), different web site addresses. For example, a web server may have sub domain names for hosting different web sites. An example is shown in FIG. 3. A corporation may have a domain name "corp.com" under which there may be multiple sub domains, e.g., aaaa.corp.com, bbbb.corp.com, cccc.corp.com, and dddd.corp.com, www-01, w3, and others. The methodology of the present disclosure in one embodiment allows for excluding sending of cookies in an HTTP request or the like, by disjoint or non-contiguous scope designation in HTTP cookies.

Figure 4:
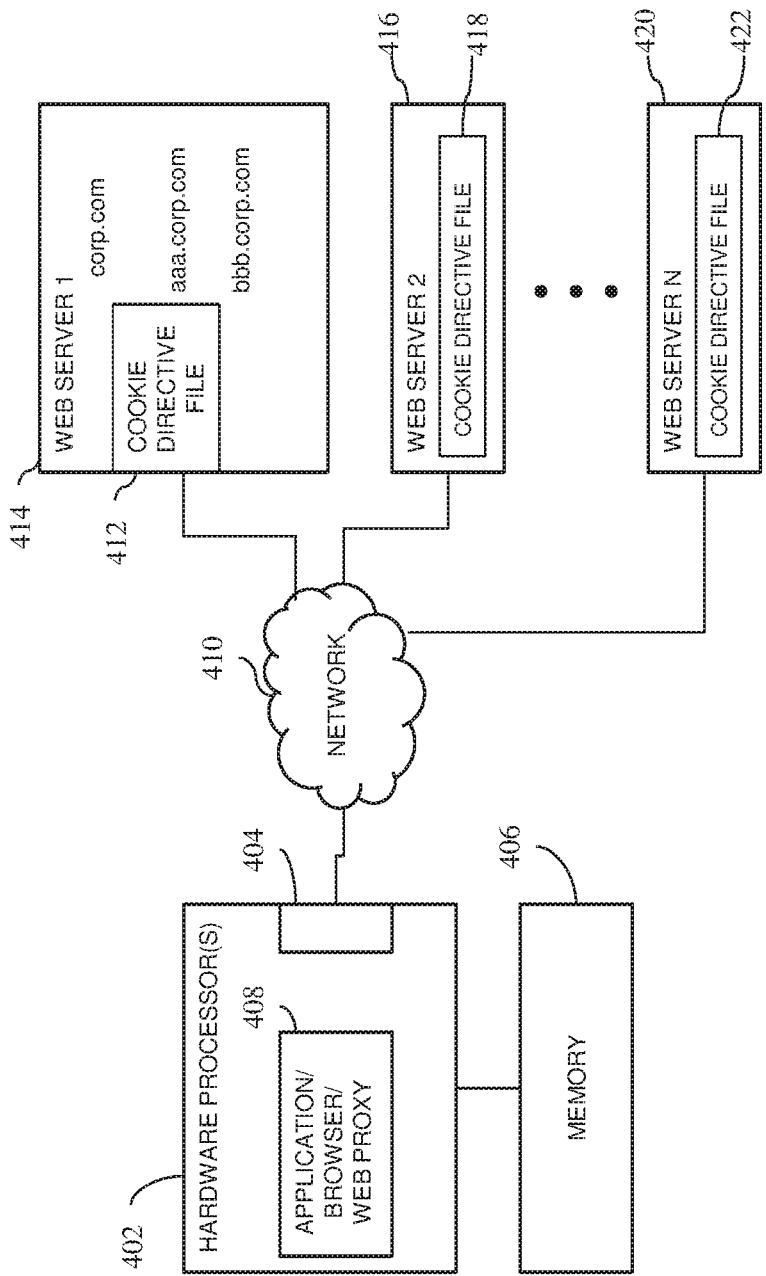
FIG. 4 is a diagram illustrating components of a system in one embodiment.

FIG. 4 is a diagram illustrating components of a system in one embodiment. A hardware processor 402 may be coupled with a network interface 404 and a memory device 406. An application 408 running on the hardware processor may request via the network interface 404 and communicate over a network 410, a cookie directive file 412 from a server computer 414 storing the cookie directive file 412. The cookie directive file 412 may include an exclusion directive specifying sub domain names of the server specified in disjointed form, for example, example of which are described above. The application 408 further may receive the cookie directive file 414 from the server computer 416 and store the cookie directive file 412 in the memory device 406. Responsive to detecting a browser request to send to the server computer, the application 408 may cull existing cookies based on cookie setting attributes associated with the existing cookies, and remove from a culled list of existing cookies, a cookie that matches the exclusion directive. The application 408 may send the request to the server computer 414, suppressing sending of the cookie that matches the exclusion directive. While the above description referred to a server and a cookie directive file referenced at 412 and 414 as examples, the application 408 may communicate in similar manner to other web servers (e.g., 416, 420) storing respective directive files (e.g., 418, 422).

Examples of the cookie setting attributes may include cookie scope, expiration and security designators. The browser request may include a hypertext transfer protocol (HTTP) request. In one embodiment, the application 408 may include a web browser. For instance, a web browser triggers, e.g., by a user entering a web site address to visit, or clicking on a link on a web page, or automated request to navigating a web site, or others, to send a browser request to a web site address. In one aspect, the web browser retrieves the existing cookies stored in the memory device to cull the existing cookies.

In another embodiment, the application 408 may include a web proxy, for example, functioning as a client and server. The web proxy may receive a browser request from web browser targeted for a web server 416. The web proxy receives the existing cookies as part of a web browser request. The web proxy may modify the browser request or generate a new browser request that excludes the cookie matching the exclusion directive, and sends the modified or new browser request to the server 416.

In one aspect, the exclusion directive may include an except directive specifying sub domains associated with the server computer to exclude. In one aspect, the exclusion directive may include a domain attribute specified with wildcard that represents matching to any sequence of characters. In yet another aspect, the exclusion directive may include a client only directive that instructs the hardware processor to not present the cookie to the server computer.

Figure 5:
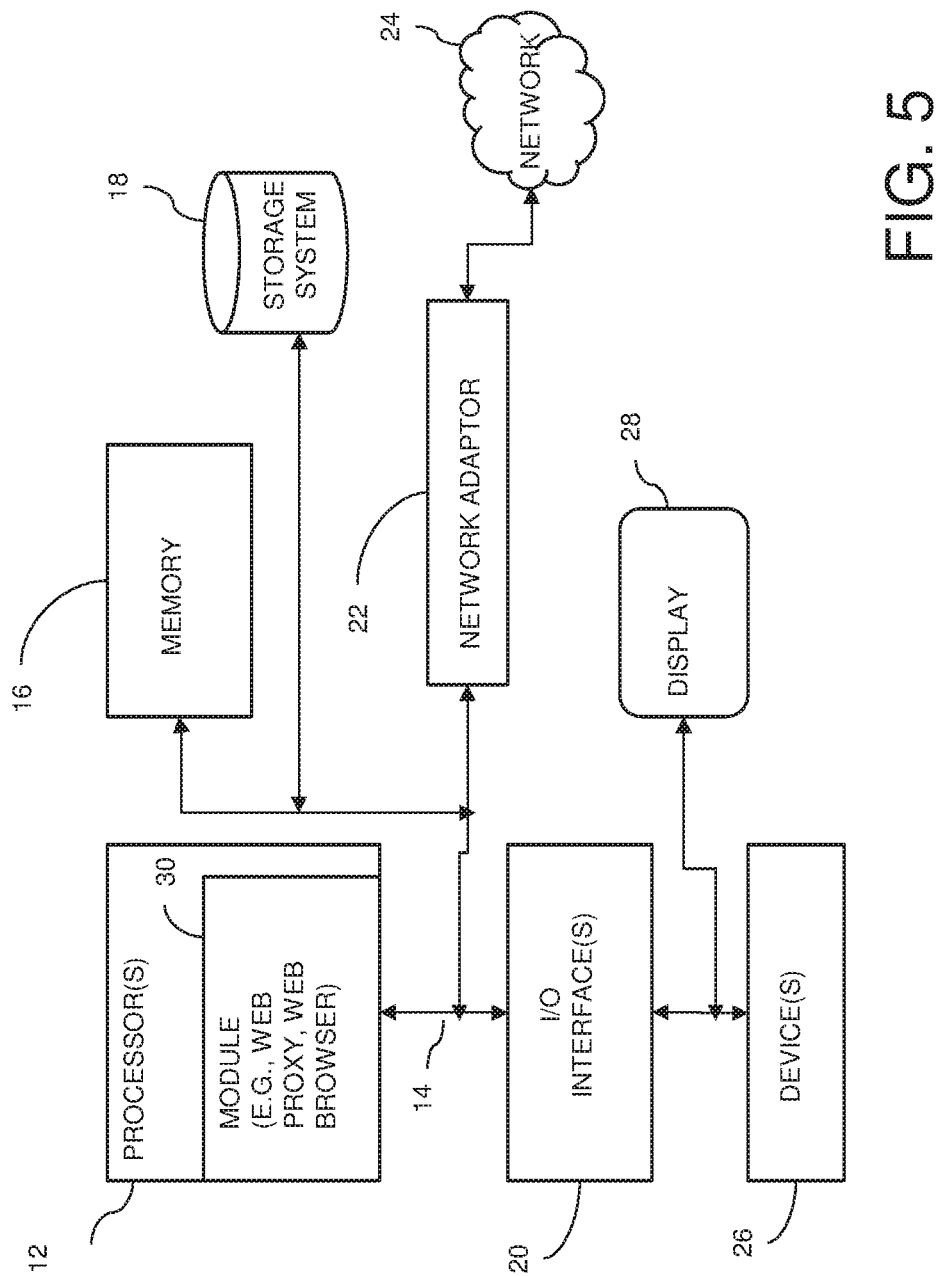
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system, comprising:

a hardware processor;

a network interface coupled with the hardware processor;

a memory device coupled with the hardware processor; and an application running on the hardware processor of a client machine, and operable to request from a server computer over a communication network via the network interface, a cookie directive file comprising an exclusion directive specifying sub domain names associated with a server specified in disjointed form, the cookie directive file specifying a list of resource locators of servers under the server computer, to which the application running on the hardware processor of the client machine is to exclude from sending a cookie, the application further operable to receive the cookie directive file from the server computer and store the cookie directive file in the memory device, the cookie directive file received as a text file including a plurality of records specified with predefined syntax using regular expressions including patterns used to match character combinations in strings, responsive to detecting a browser request to send to the server computer, the application further operable to cull existing cookies based on cookie setting attributes associated with the existing cookies, and further operable to remove from a culled list of existing cookies, a cookie that matches the exclusion directive, the application in sending the browser request to the server computer, suppressing sending of the cookie from the client machine that matches the exclusion directive.

2. The system of claim 1, wherein the application comprises a web browser.

3. The system of claim 2, wherein the web browser retrieves the existing cookies stored in the memory device to cull the existing cookies.

4. The system of claim 1, wherein the application comprises a web server proxy.

5. The system of claim 4, wherein the web server proxy receives the existing cookies as a web browser request, the web server proxy generating a new request that removes the cookie that matches the exclusion directive, in sending the request to the server computer.

6. The system of claim 1, wherein the cookie setting attributes comprise cookie scope, expiration and security designators.

7. The system of claim 1, wherein the browser request comprises a hypertext transfer protocol (HTTP) request.

8. The system of claim 1, wherein the exclusion directive further comprises an except direct specifying sub domains associated with the server computer to exclude.

9. The system of claim 1, wherein the exclusion directive comprises a domain attribute specified with wildcard to match any sequence of characters.

10. The system of claim 1, wherein the exclusion directive comprises a client only directive that instructs the hardware processor to not present the cookie to the server computer.

11. A method comprising:
   requesting, by a hardware processor of a client machine, via a network interface a cookie directive file from a server computer storing the cookie directive file, the cookie directive file comprising an exclusion directive specifying sub domain names associated with a server specified in disjointed form, the cookie directive file specifying a list of resource locators of servers under the server computer, to which the hardware processor of the client machine is to exclude from sending a cookie;
   receiving by the hardware processor, the cookie directive file from the server computer, the cookie directive file received as a text file including a plurality of records specified with predefined syntax using regular expressions including patterns used to match character combinations in strings;
   storing by the hardware processor, the cookie directive file in a memory device coupled with the hardware processor;
   responsive to detecting a browser request to send to the server computer, culling by the hardware processor existing cookies based on cookie setting attributes associated with the existing cookies, and removing from a culled list of existing cookies to be sent with the browser request, a cookie that matches the exclusion directive; and
   sending, by the hardware processor of the client machine, to the server the browser request without the cookie that matches the exclusion directive.

12. The method of claim 11, wherein a web browser executing on the hardware processor performs the requesting, the receiving, the storing, the culling and the removing.

13. The method of claim 12, wherein the web browser retrieves the existing cookies stored in the memory device to cull the existing cookies.

14. The method of claim 11, wherein a web server proxy executing on the hardware processor performs the requesting, the receiving, the storing, the culling and the removing.

15. The method of claim 14, wherein the web server proxy receives the existing cookies in a web browser request from a web browser and generates a modified web browser request, wherein the browser request that is sent without the cookie that matches the exclusion directive comprises the modified web browser request.

16. The method of claim 11, wherein the exclusion directive further comprises an except direct specifying sub domains associated with the server computer to exclude.

17. The method of claim 11, wherein the exclusion directive comprises a domain attribute specified with wildcard to match any sequence of characters.

18. The method of claim 11, wherein the exclusion directive comprises a client only directive that instructs the hardware processor to not present the cookie to the server computer.

19. A computer program product comprising a computer readable storage medium having program instructions embodied therewith, the program instructions readable by a device to cause the device to:
   request from a client machine via a network interface a cookie directive file from a server computer storing the cookie directive file, the cookie directive file comprising an exclusion directive specifying sub domain names associated with a server specified in disjointed form, the cookie directive file specifying a list of resource locators of servers under the server computer, to which the client machine is to exclude from sending a cookie;
   receive the cookie directive file from the server computer, the cookie directive file received as a text file including a plurality of records specified with predefined syntax using regular expressions including patterns used to match character combinations in strings;
   store the cookie directive file in a memory device;
   responsive to detecting a browser request to send to the server computer, cull existing cookies based on cookie setting attributes associated with the existing cookies, and remove from a culled list of existing cookies to be sent with the browser request, a cookie that matches the exclusion directive; and
   send from the client machine to the server the browser request without the cookie that matches the exclusion directive.

20. The computer program product of claim 19, wherein the exclusion directive further comprises an except direct specifying sub domains associated with the server computer to exclude.

* * * * *